(12) United States Patent
Masuda et al.

(10) Patent No.: US 6,661,341 B2
(45) Date of Patent: Dec. 9, 2003

(54) CAR-SEAT-OCCUPANT SENSING DEVICE

(75) Inventors: Ko Masuda, Yokohama (JP);
Katsutoshi Sasaki, Tokyo (JP); Ken Obata, Tokyo (JP); Hiroyuki Yamazaki, Tokyo (JP); Takuya Nishimoto, Tokyo (JP)

(73) Assignee: NHK Spring Co., Ltd. (JP)

( * ) Notice: Subject to any disclaimer, the term of this patent is extended or adjusted under 35 U.S.C. 154(b) by 0 days.

(21) Appl. No.: 09/985,801

(22) Filed: Nov. 6, 2001

(65) Prior Publication Data

US 2002/0053980 A1 May 9, 2002

(30) Foreign Application Priority Data

Nov. 8, 2000 (JP) .......................... 2000-340538

(51) Int. Cl.⁷ .............................................. G08B 13/26
(52) U.S. Cl. ...................... 340/562; 340/665; 340/667; 340/668; 177/225; 200/453; 200/462; 200/85 A; 180/273
(58) Field of Search .................. 340/562, 665, 340/667, 668, 666; 177/45, 48, 136, 225; 200/600, 61.74, 61.76, 61.78, 453, 462, 85 R, 85 A; 180/273; 73/862.381, 862.42, 862.641; 324/661, 662, 686, 690

(56) References Cited

U.S. PATENT DOCUMENTS

| | | | | | |
|---|---|---|---|---|---|
| 4,539,560 A | * | 9/1985 | Fleck et al. | ............... | 340/573.1 |
| 5,446,391 A | * | 8/1995 | Aoki et al. | ................... | 340/562 |
| 5,573,269 A | * | 11/1996 | Gentry et al. | ................ | 280/735 |
| 5,739,757 A | * | 4/1998 | Gioutsos | ..................... | 340/667 |
| 5,780,937 A | * | 7/1998 | Kong | ......................... | 307/10.1 |
| 5,864,295 A | * | 1/1999 | Jarocha | ...................... | 340/667 |
| 5,905,210 A | * | 5/1999 | O'Boyle et al. | ........ | 73/862.331 |
| 5,971,432 A | * | 10/1999 | Gagnon et al. | ............. | 280/735 |
| 5,991,676 A | * | 11/1999 | Podoloff et al. | ............... | 701/45 |
| 6,040,532 A | * | 3/2000 | Munch | ........................ | 177/144 |
| 6,087,598 A | * | 7/2000 | Munch | ........................ | 177/144 |
| 6,218,632 B1 | * | 4/2001 | McCarthy et al. | .......... | 177/144 |
| 6,271,760 B1 | * | 8/2001 | Watanabe et al. | .......... | 340/667 |
| 6,286,861 B1 | * | 9/2001 | Cech et al. | ................. | 280/735 |
| 6,323,443 B1 | * | 11/2001 | Aoki et al. | ................. | 177/144 |

FOREIGN PATENT DOCUMENTS

| EP | 0855307 | 7/1908 |
|---|---|---|
| EP | 0670239 | 9/1995 |
| WO | WO9830874 | 7/1998 |
| WO | WO9835861 | 8/1998 |

* cited by examiner

Primary Examiner—Toan Pham
(74) Attorney, Agent, or Firm—Lowe Hauptman; Gilman & Berner, LLP

(57) ABSTRACT

A seat-occupant sensing device for a car seat is provided, such that a heater can be installed in the seat without deterioration of sitting comfort. A load sensor is mounted to a cushion frame of a car seat. The end of a flexible cushion support is linked with the load sensor. Because the flexible cushion support flexes when a person sits on the seat, the load sensor detects the moment when the person sits on the seat.

20 Claims, 7 Drawing Sheets

CAR-SEAT-OCCUPANT SENSING DEVICE

BACKGROUND OF THE INVENTION

1. Field of the Invention

The present invention relates to a sensing device for sensing when a car seat is occupied.

2. Description of the Related Art

FIG. 10 shows a car seat 1, to which a seat-occupant sensing device 4 is mounted to the seat cushion 3, to which a seat back 2 is mounted via a seat-reclining mechanism. The seat-occupant sensing device 4 is provided at approximately the center (as shown by the diagonal lines) of the seat cushion 3, where an occupant will sit FIG. 11 shows a wide mat-type conventional seat-occupant sensing device 4. The seat-occupant sensing device 4 consists of a flat sensor-support part 5, a plurality of pressure sensors 6 that are affixed to the sensor-support part 5, a wire 7 that connects said pressure sensors 6 with a harness wire 8 that is designed to conduct sensing signals.

FIG. 12 is a cross-section from-front-to-back view of a seat cushion 3 along the line A of FIG. 10. Cushion springs 10 are installed in the cushion frame 9, on which is installed a cushion pad 11 that is composed of foam urethane. A seat-occupant sensing device 4 is installed on the cushion pad 11, which is covered with a trim cover 12. With such a structure, because the seat-occupant sensing device 4 senses a load when a passenger or a driver is seated on a seat 1, it is possible to know whether a seat is occupied or not.

However, a conventional seat-occupant sensing device 4 has the following problems.

(1) When a mat-like heater is built into the seat cushion 3, the heater is laminated on the mat-type seat-occupant sensing device 4. However, when such a heater is placed on the sensing device, two layers of lamination are formed, resulting in a hard and uncomfortable seat surface.

(2) Because the performance characteristics of a mat-type seat-occupant sensing device 4 tend to vary depending on the temperature, the performance of the sensors tends to be adversely affected by the heat that they are subjected to when the seat-occupant sensing device 4 is covered by such a heater.

(3) When the trim cover 12 is broken or damaged, the seating sensor 4 beneath the cover might also be damaged and its performance adversely affected.

(4) When the cushion pad 11 and the trim cover 12 become worn as time elapses, the sensing capabilities of the seat-occupant sensing device 4 deteriorate.

SUMMARY OF THE INVENTION

In view of the conventional problems, the objective of the present invention is to provide a car-seat-occupant sensing device wherein (1) a mat-like heater can be installed in a seat, such as in the seat cushion, without adversely affecting a seat's sitting comfort for a driver or passenger, and (2) damage to the sensing device can be prevented.

For the purpose of achieving the above-mentioned objective, the seat-occupant sensing device of the present invention is characterized such that (1) the area between two electrodes that face each other is increases or decreases due to the contraction or extension (lengthening), respectively, of a pressure-detecting spring, (2) the sensing device is equipped with (a) load sensors that conduct electrostatic capacitance, which changes in accordance with the increase or decrease of the area between the aforementioned electrodes, and (b) cushion springs that are installed in the seat frame, and (3) one end of each of said pressure-detecting spring is connected to the seat frame and the other end is connected to the end of a cushion spring.

The load sensor is constituted such that two electrodes that face each other constitute a capacitor. Thus, when a person sits on a car seat, a load is placed on a sensor, causing the pressure-detecting springs to extend (lengthen). As a result, the area between the two electrodes that are related to each pressure-detecting spring becomes smaller, whereby the sensor determines that a load is being applied thereon.

According to the present invention, when a person sits on a seat the cushion springs are caused to flex as a result of the load that is applied by the person sitting on the seat. Because this flexing is transmitted to the load sensors, seating can be sensed. Therefore, the load sensor does not have to be formed into a wide mat-shape, nor to be placed at the portion of the seat where a person's buttocks rest when the person is sitting in the seat. Thus, the cushioning property of the seating portion of the seat is not adversely affected, and sitting comfort can be maintained. Also, if the cushion pad and the trim cover are broken, the load sensor is not broken, nor is its performance adversely affected. Furthermore, if a mat-like heater is installed in the seat, the heat that is emitted from the heater is not conveyed to the load sensors.

The seat-occupant sensing device for a car seat of the invention is characterized such that (1) the area between two electrodes that face each other increases or decreases due to the contraction or lengthening, respectively, of the aforementioned pressure-detecting spring, (2) the sensing device is equipped with (a) a load sensor that conducts electrostatic capacitance, which changes as the area between the electrodes increases or decreases, and (b) a sensing plate that is installed in the seat frame via a fixing spring, and (3) one end of each of said pressure-detecting springs is connected to the seat frame and the other end is connected to the sensing plate.

According to the present invention, because the sensing plate senses the load of a person sitting on the seat and the spring is then flexed (lengthened), the load sensor that is connected with the spring can sense when a person sits on the seat. In this invention, because a load sensor does not have to be installed in the seating portion of the seat, a seat heater can be installed in the seat while sitting comfort can be maintained, and the load sensor is not adversely affected if the cushion pad or trim cover is broken, as mentioned above.

The invention is further characterized such that (1) said load sensor is equipped with a pair of insulated inner and outer tubular members, each of which is attached to one end of a detecting-spring, (2) two electrodes face each other, with one being on the outside of the inner tubular detecting-spring holding member (hereinafter "inner holding member") and the other being on the inside of the outer tubular detecting-spring holding member (hereinafter "outer holding member"), (3) both the inner and outer holding members move in opposite directions as the pressure-detecting spring extends or contracts, and (4) the outer holding member slides rectilinearly along a movement-guiding member that is a part of the inner holding member.

In this invention, because both the inner and outer holding members move, thereby causing an increase or decrease in the area between the aforementioned two electrodes that face each other, a load can be detected. And because each pair of the holding members slide rectilinearly in opposite directions, variations of the electrostatic capacitance between the holding members can be sensed with great accuracy.

The invention is further characterized such that the aforementioned load sensor is equipped with (a) a pair of insulated inner and outer holding members, which can move in opposite directions as the aforementioned pressure-detecting spring extends or contracts, and each of which is attached to one of the aforementioned two electrodes, as described above, and (b) an insulating spacer that is placed between the inner and outer holding members.

In this invention, because both the inner and outer holding members move, thereby causing an increase or decrease in the area between the aforementioned two electrodes that face each other, a load can be detected. Also, because the aforementioned insulating spacer acts to maintain a constant gap between the aforementioned two electrodes, when the aforementioned holding members move the electrostatic capacitance between the electrodes varies rectilinearly when a load is detected but returns to the constant-gap value after the load is removed (i.e., after the person gets out of the seat), which ensures that the sensor is able to accurately measure variations in the load as different persons sit in or leave the seat. Thus, the sensing device can detect not only when a person sits in the seat, but it can also easily measure the weight of that person and can detect when the person gets out of the seat.

DESCRIPTION OF THE PREFERRED EMBODIMENTS

The preferred embodiments of the present invention will be described in detail with reference to the drawings. In each embodiment, the same parts have the same numbers.

Embodiment 1

Figure 1:
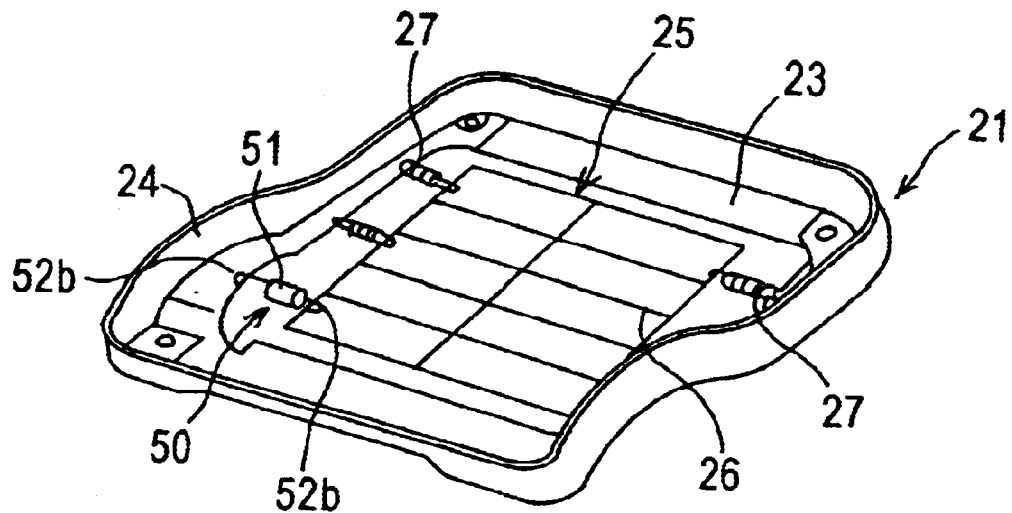
FIG. 1 is a perspective view of the entirety of Embodiment 1 of the present invention.
Figure 2:
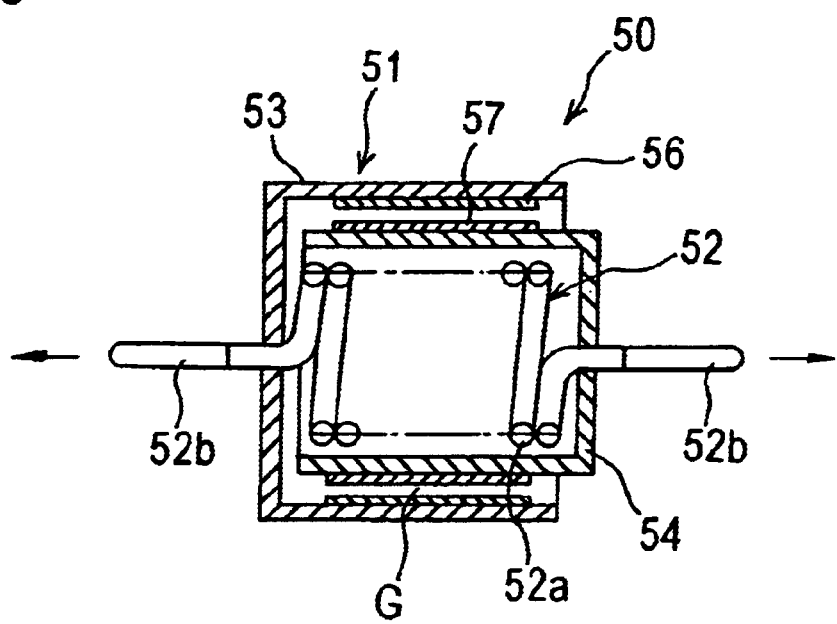
FIG. 2 is a vertical cross-section view of a load sensor.

FIGS. 1 and 2 show Embodiment 1 of the present invention. This embodiment is applied for a seat cushion that the portion of the car seat where a person sits. A cushion frame 21 of the car seat is shaped so that an outer-side vertical part 24 stands upright along the entire periphery of a frame-like bottom part 23, and a flexible cushion support 25 is mounted to the bottom part 23.

The flexible cushion support 25 consists of a main cushion-support member 26, which is composed of spring wires that are vertically and horizontally assembled into a rectangular shape, and cushion-support coil springs 27. One end of each coil spring 27 is hooked on the main cushion-support member 26, and the other end is hooked to the cushion frame 21. When a cushion pad (not shown) is put on the cushion frame 21, the main cushion-support member 26 and the cushion-support coil springs 27 flex so as to improve sitting comfort.

In this embodiment, one of the plural cushion-support coil springs 27 is replaced by a load sensor 50. Hook parts 52b of a pressure-detecting spring 52 protrude from the right and left sides of the load sensor 50, and one hook part 52b is hooked to the bottom part 23 of the cushion frame 21 and the other hook part 52b is hooked to the main cushion-support member 26 of the flexible cushion support 25. With such an attachment, the flexible cushion support 25 is able to flex so that the load sensor 50 can sense the load when a person sits on the seat.

Figure 3A:
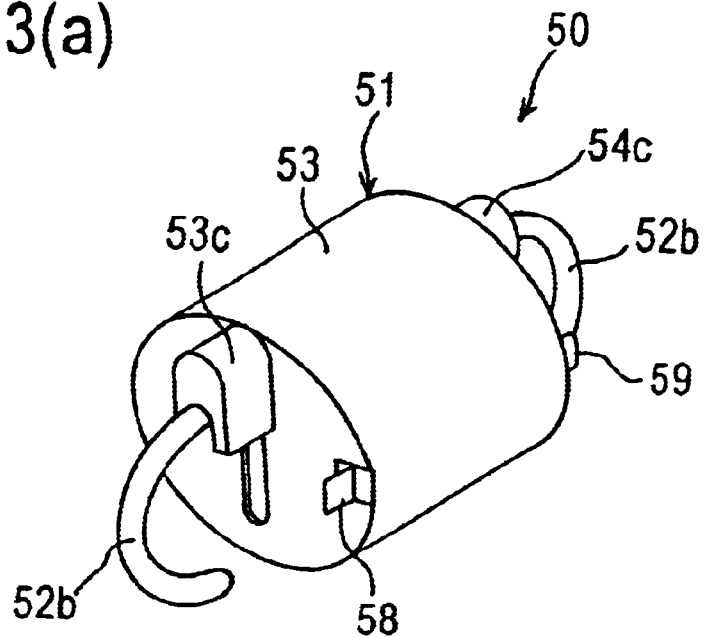
FIG. 3(a) is a perspective view of a load sensor before its actuation.
Figure 3B:
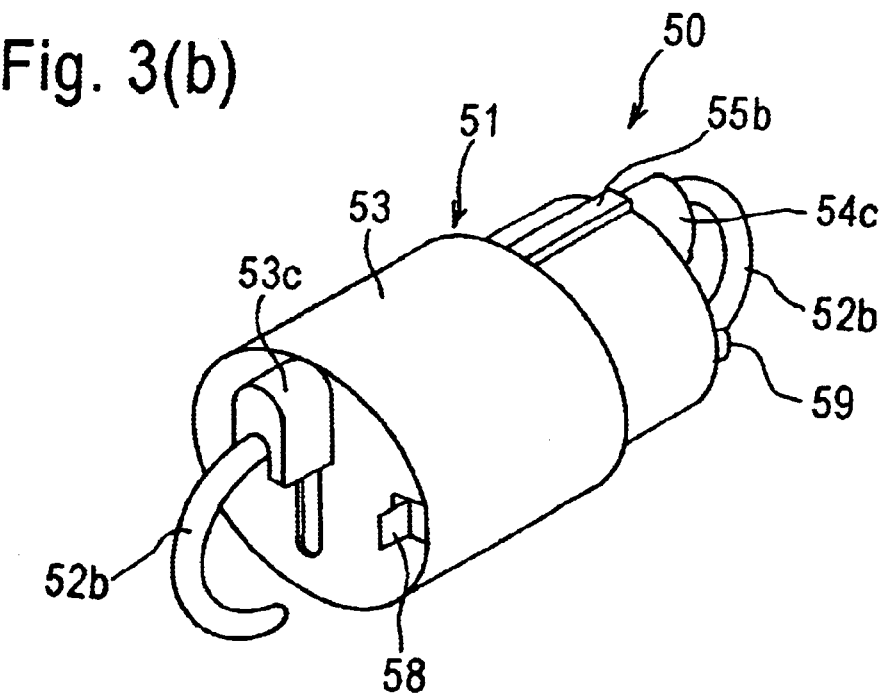
FIG. 3(b) is a perspective view during its actuation.
Figure 4A:
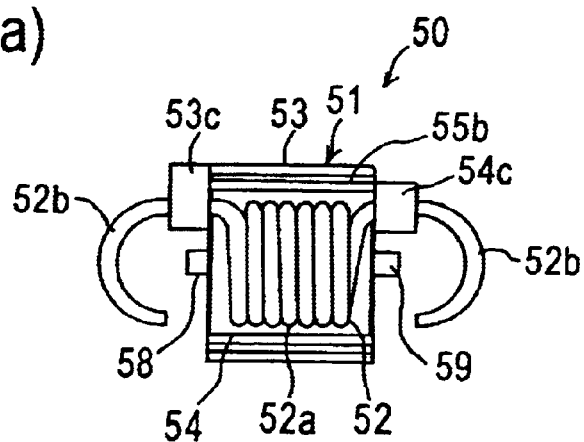
FIG. 4(a) is a cross-sectional view of a load sensor before its actuation.
Figure 4B:
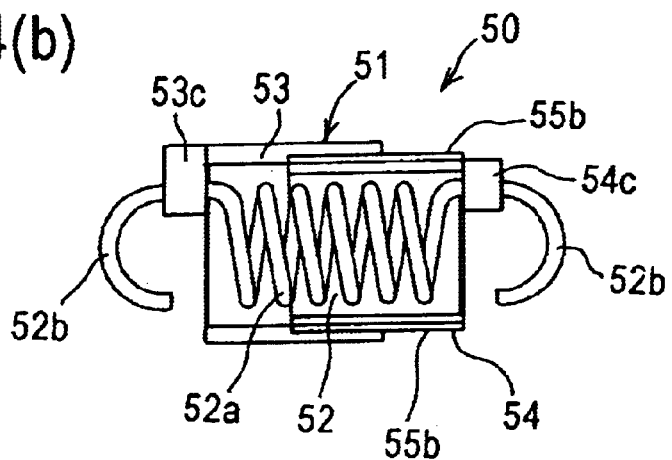
FIG. 4(b) is a cross-sectional view during its actuation.

FIGS. 2–4 show a load sensor 50, which is equipped with a sensor part 51 and a pressure-detecting spring 52.

The sensor part 51 is equipped with an outer holding member 53 that is formed into a tubular shape and an inner holding member 54 that also is formed into a tubular shape and that is inserted into the outer holding member 53 in such a way that they both can move rectilinearly in both directions along the members' axial line. The holding members 53 and 54 are made entirely of an insulating material such as plastic.

Electrodes 56 and 57 are attached to the outer holding member 53 and the inner holding member 54, respectively, in such a way that they face each other. That is to say, the outer electrode 56 is mounted on the inner face of the outer holding member 53 by adhesion or fusion (gluing or welding), and the inner electrode 57 that faces outer electrode 56 is mounted on the outer face of the inner holding member 54 by the same means. Each of the electrodes 56 and 57 is formed into a tubular shape like the holding members 53 and 54. In addition, the electrodes 56 and 57 face each other, separated by a gap G whose distance is maintained at a constant level.

In this way, a pair of the electrodes 56 and 57, separated by the gap G, are mounted to the corresponding pair of holding members 53 and 54, so that the electrodes 56 and 57 constitute a capacitor. The holding members 53 and 54 are situated in such a way that they are able to move rectilinearly in both directions along the members' axial line. As the holding members 53 and 54 move, the size of the area between the electrodes 56 and 57 varies, as does the electrostatic capacitance between the electrodes. Based on the variation of the electrostatic capacitance, the load sensor 50 detects the load at the time that a person sits on the seat.

In this case, the outer electrode 56 and the inner electrode 57 have terminals 58 and 59 that protrude outwardly from the outer holding member 53 and the inner holding member 54, respectively. The terminals 58 and 59 are connected to a detector (not shown) via a lead wire so as to detect the aforementioned load.

Figure 5:
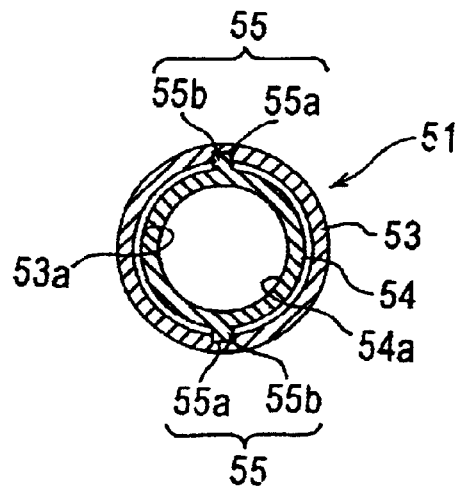
FIG. 5 is a vertical cross-section view of the sensor part of a load sensor.

In this embodiment, the inner holding member 54 includes movement-guiding elements 55 that serve to guide the sliding movement of the holding members 53 and 54 along each other. As shown in FIG. 5, the movement-guiding elements 55 consist of (a) a pair of movement-guiding grooves 55a that are bored rectilinearly in the axial direction and are located 180° apart from each other (i.e., on exactly opposite sides) of the inner face 53a of the outer holding member 53, and (b) a pair of movement-guiding prominences 55b that protrude from the outer face 54a of the inner holding member 54 at locations 180° apart from each other (i.e., on exactly opposite sides). The outer holding member 53 and the inner holding member 54 are attached to each other in such a way that the movement-guiding prominences 55b are inserted into the movement-guiding grooves 55a. Thus, the outer holding member 53 and the inner holding member 54 can slide rectilinearly while the rotation of both members is restrained. Because the outer holding member 53 and the inner holding member 54 slide rectilinearly so as to vary the electrostatic capacitance between the electrodes 56 and 57, the load can be precisely detected. Therefore, it is possible not only to detect when a person sits on the seat, but also to easily measure the weight of that person.

The pressure-detecting spring 52 comprises a coil spring whose coil portion 52a is inserted into the inner holding member 54. Hook portions 52b integrally extend in an axial direction from both ends of the coil portion 52a. Retainer portions 53c, and 54c protrude on the unbored end faces of the outer holding member 53 and the inner holding member 54, and the above-mentioned hook portions 52b penetrate through the retainer portions 53c and 54c, respectively, and are pulled to the outside. Thereby, as the pressure-detecting spring 52 extends and contracts, the outer holding member 53 and the inner holding member 54 slide oppositely in the axial direction in accordance with this extending and contracting movement.

With such a structure, because the flexible cushion support 25 is flexed when a person sits on the seat cushion 3, the pressure-detecting spring 52 extends and contracts, and the outer holding member 53 and the inner holding member 54 slide, thereby causing the area between the electrodes 56 and 57 to vary. That makes it possible to sense when a person sits on the seat. In this embodiment, because a load sensor 50 for sensing when a person sits on the seat is attached only to the outer-side vertical part 24 of the cushion frame 21 and not to the central seating portion of the seat cushion 3, the seat cushion does not become hard and sitting comfort can be maintained. Also, because the load sensor 50 is positioned on the side face of the cushion frame 21, the sensor does not break or deteriorate in performance even if the cushion pad 11 and the trim cover 12 (not shown) are broken or worn down. Furthermore, if a mat-like heater is installed in the seating portion of the seat cushion 21, heat from that heater is not conveyed to the load sensor 50.

Embodiment 2

Figure 6:
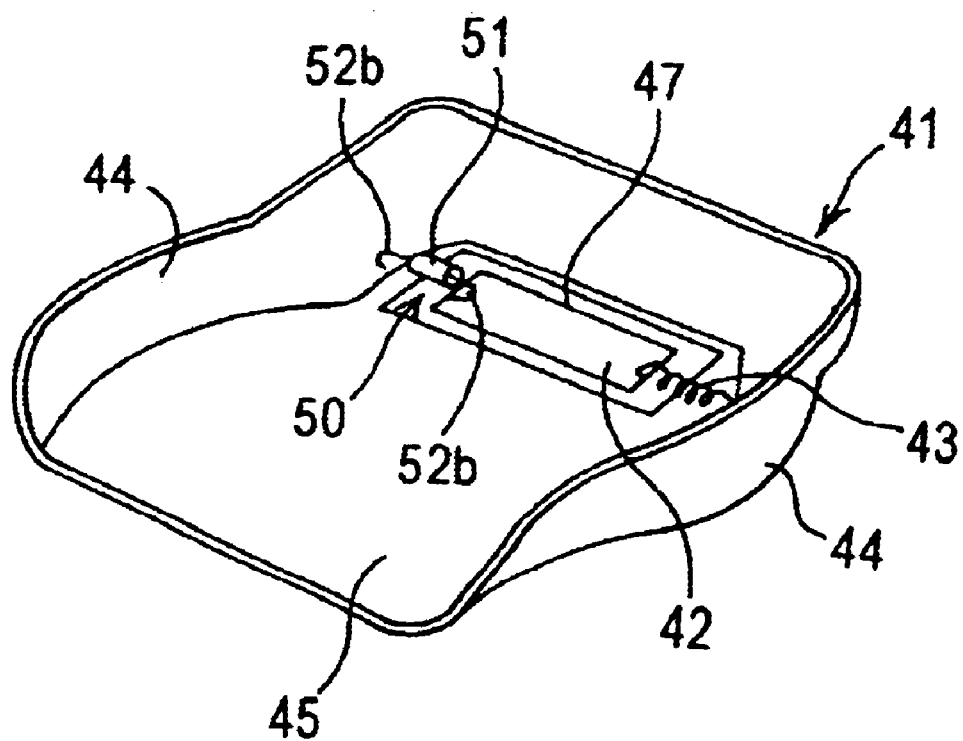
FIG. 6 is a perspective view of the entirety of Embodiment 2 of the present invention.

FIG. 6 shows Embodiment 2 of the present invention. The cushion frame 41 used in this embodiment is a pan-type frame, which is formed so that its bottom part 45 is entirely shaped into a flat plan and its vertical side part 44 integrally stands upright along the periphery of the two sides and back (and not the front) of the frame's bottom part 45. The frame is made entirely of resin. Such a pan-type cushion frame 41 does not include a flexible cushion support. A slit 47 that is used for installing the sensing plate 42, described below, is formed at the bottom part 45 of the pan-type cushion frame 41.

In this embodiment, the pan-type cushion frame 41 includes a flat sensing plate 42. One end of an sensing-plate coil spring 43 is hooked at one side of the sensing plate 42 in the lengthwise direction, and the other end of the sensing-plate coil spring 43 is hooked to the right or left vertical side part 44 of the pan-type cushion frame 41, so as to arrange the sensing plate 42 on top of the above-mentioned slit 47.

The load sensor 50 is linked to the other end of the sensing plate 42. The hook portion 52b at the inner end of the pressure-detecting spring 52 is hooked to the sensing plate 42 and the hook part at the outer end is hooked to the vertical side part 44 of the pan-type cushion frame 41, so that the load sensor 50 is attached between the sensing plate 42 and the vertical side part 44 of the pan-type cushion frame 41 so as to support one end (in FIG. 6, the left-side end) of the sensing plate 42. Thus, there is no need to provide two sensing-plate coil springs, and therefore one of them can be replaced by a load sensor 50.

In this embodiment, because the load sensor 50 for sensing when a person sits on the seat is attached on the vertical side part 44 of the pan-type cushion frame 41 and not arranged at the seating portion of the seat cushion 3, the seat cushion does not become hard, and sitting comfort can be maintained. Also, because the load sensor 50 is positioned on the vertical side part of the pan-type cushion frame 41, the sensor does not break or deteriorate in its performance even if the cushion pad 11 and the trim cover 12 (not shown) are broken or worn down. Even if a mat-like heater is installed in the seating portion of the seat cushion 41, heat from that heater is not conveyed to the load sensor 50.

Embodiment 3

Figure 7:
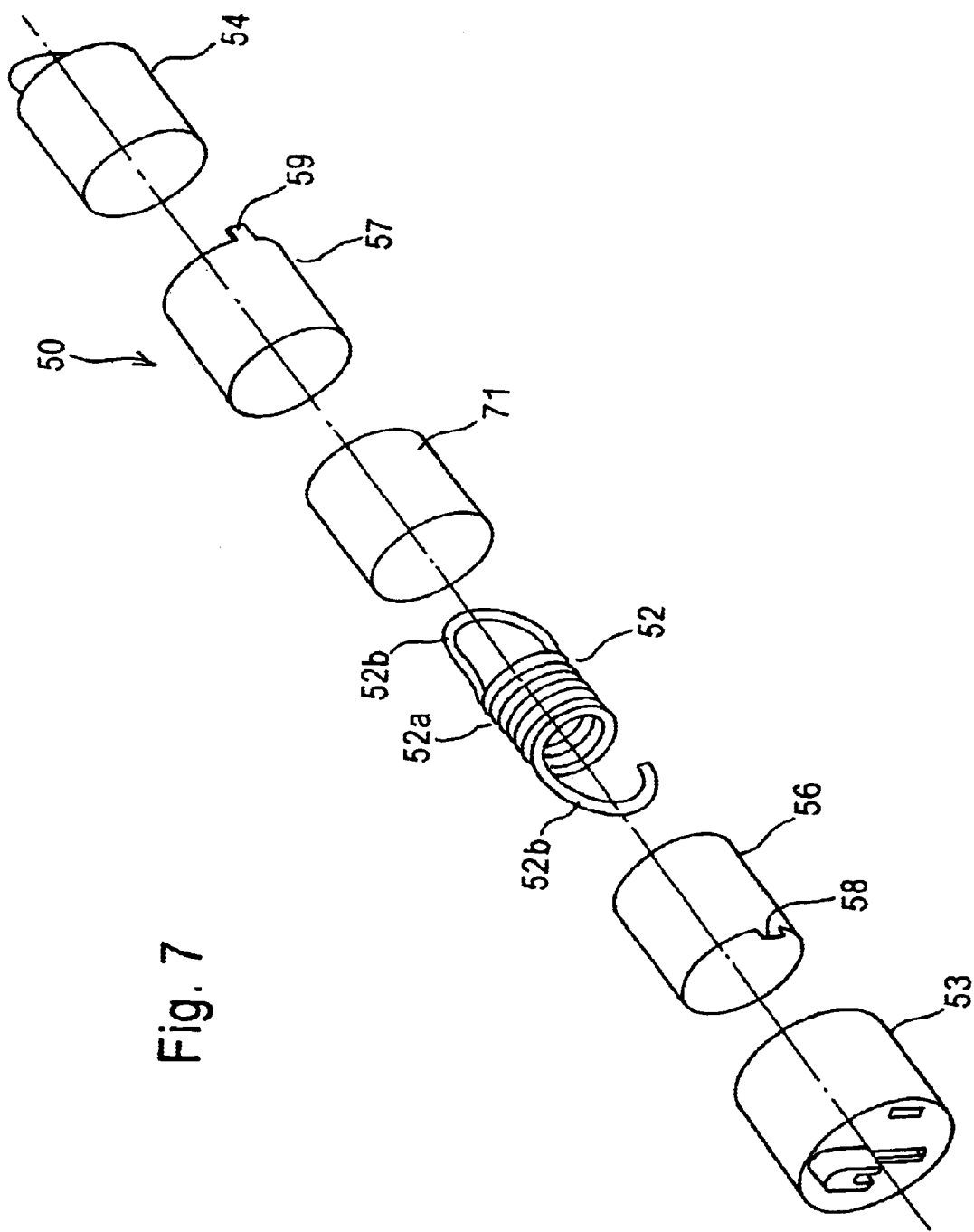
FIG. 7 is a perspective view of all the parts of a disassembled load sensor of Embodiment 3 of the present invention.
Figure 8:
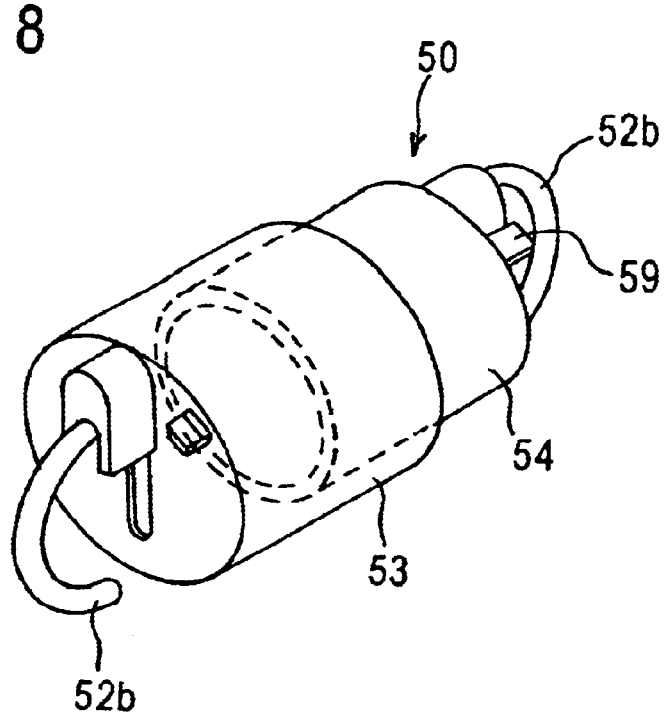
FIG. 8 is a perspective view of a load sensor of Embodiment 3 during its actuation.
Figure 9:
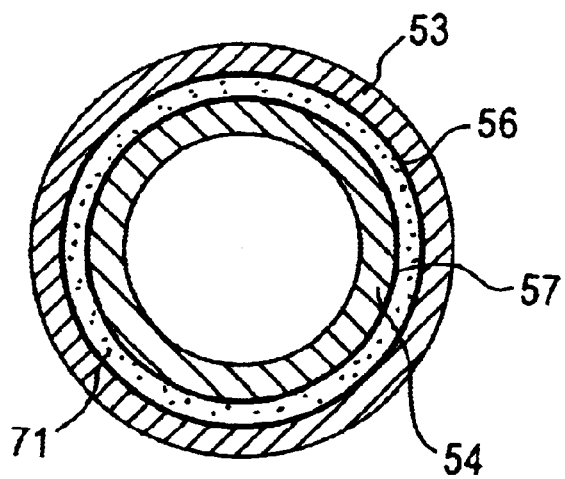
FIG. 9 is a vertical cross-section view of a load sensor of Embodiment 3.
Figure 10:
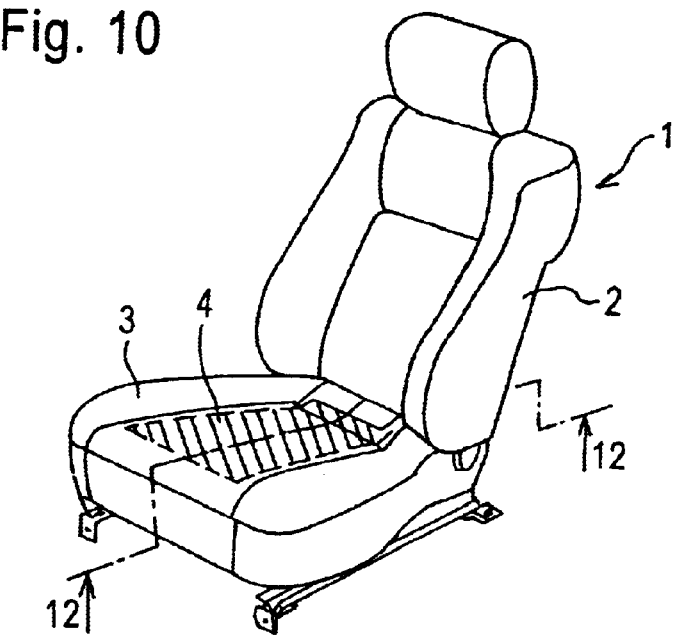
FIG. 10 is a perspective view of a car seat.
Figure 11:
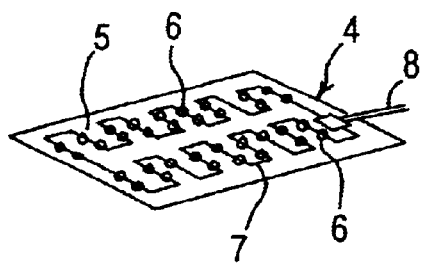
FIG. 11 is a perspective view of a conventional seat-occupant sensing device.
Figure 12:
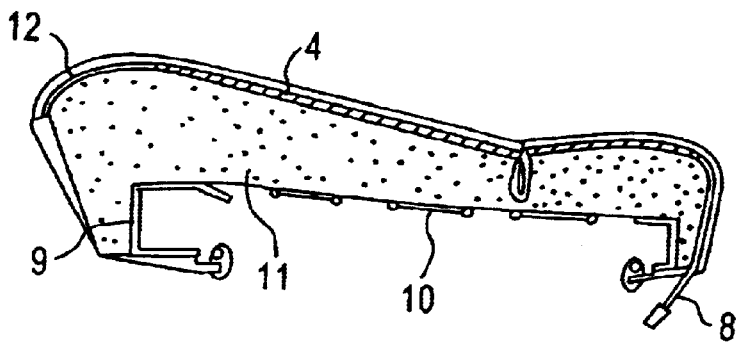
FIG. 12 is an enlarged cross-sectional view along Line A in FIG. 10.

FIGS. 7–9 show the load sensor 50 in Embodiment 3 of the present invention. With respect to the load sensor 50 of Embodiment 3, the pressure-detecting spring 52 is inserted in the inner holding member 54, and the inner holding member 54 is inserted in the outer holding member 53 in such a way that both holding members can move rectilinearly in the axial direction along each other. Also, an inner electrode 57 having a terminal 59 on one end is attached to the outer face of the inner holding member 54 and an outer electrode 56 having a terminal 58 on one end is attached on the inner face of the outer holding member 53. Thus, the inner holding member 54 is inserted in the outer holding member 53 in such a way that the inner electrode 57 and the outer electrode 56 face each other.

As shown in FIGS. 7 and 9, an insulating spacer 71 is inserted between the outer holding member 53 and the inner holding member 54 in such a way that the electrodes 56 and 57 are attached as mentioned above. The insulating spacer 71, which is made of a fluoric resin such as tetrafluoroethylene, or an olefinic resin such as polypropylene and polyethylene, or some other insulating material, is formed into a tubular shape of a specified thickness. The insulating spacer 71 is inserted so that the distance between the electrodes 56 and 57 can be maintained constant.

FIG. 8 shows a condition such that the pressure-detecting spring 52 extends when a person sits in the seat, and thereby the outer holding member 53 and the inner holding member 54 slide along each other in opposite directions so as to lengthen the distance over which the holding members 53 and 54 are extended. This sliding motion causes the area between the outer electrode 56 and the inner electrode 57 to vary, which is the means by which the sitting of a person in the seat is sensed.

In this embodiment, because the insulating spacer 71 is inserted between the outer holding member 53 and the inner holding member 54, the sliding motion of the holding members 53 and 54 is smooth. Therefore, because the insulating spacer 71 acts to maintain a constant gap between the electrodes 56 and 57, the electrostatic capacitance between the electrodes 56 and 57 varies only as the holding members 53 and 54 move rectilinearly. As a result when the holding members 53 and 54 move, the electrostatic capacitance between the electrodes varies rectilinearly while a load is detected, but it returns to the constant-gap value after the load is removed (i.e., after the person gets out of the seat), which ensures that the sensor is able to accurately measure variations in the load as different persons sit in or leave the seat. Thus, the sensing device can detect not only when a person sits in the seat, but it can also easily measure the weight of that person and can detect when the person gets out of the seat.

In Embodiments 1–3 as described above, because the pressure-detecting spring 52 of the load sensor 50 can be replaced with one of the springs used for the cushion frames 21 and 41, the load sensor 50 can be used as it is for conventional cushion frames 21 and 41. This makes it possible to eliminate the need to change the design of the conventional cushion frames 21 and 41.

The present invention is not limited to the above-mentioned embodiments, and it can be changed in various ways. For example, although in the above-mentioned embodiments the sensor part 51 slides by using the hook portions 52*b* at both ends of the pressure-detecting spring 52, the present invention can have such a structure that the outer holding member 53 or the inner holding member 54 is directly connected (by welding, or by fastening with a bolt via a bracket) to one member of the cushion frame or to the cushion-frame receiving member (not shown), and the hook portion 52*b* of the pressure-detecting spring 52 is connected to the other member. Even with such a structure, because the pressure-detecting spring 52 extends (lengthens) when a person sits in the seat, and the outer holding member 53 and the inner holding member 54 slide, when a person sits in the seat can be detected. Furthermore, a plurality of load sensors 50 can be arranged between the seat cushion 3 and the seat receiving member. The outer holding member 53 and the inner holding member 54 of the load sensor 50 can be formed into a polygonal-tubular shape or other non-circular-tubular shape.

In the above-mentioned embodiment, the load sensor 50 is mounted on the vertical side part of the cushion frame 9 or 21, but it can be mounted on another portion of the cushion frame as long as the sensor is arranged on the portion other than the seating portion of the frame.

In the above-mentioned embodiment, the present invention is applied to a seat cushion, but it also can be applied to a backrest portion or a seat back. In such a case, the pressure-detecting spring 52 of the load sensor 50 is connected with either the flexible cushion support built in the seat back frame or with the sensing plate built in the seat-back frame.

As described above, in the invention, the load sensor does not have to be a wide mat-like shape, nor need it be installed at the seating portion of the seat, thereby maintaining sitting comfort without causing deterioration of the cushioning property of the seating portion. Also, if the cushion pad 11 and the trim cover 12 are broken, the load sensor is not broken and its performance does not deteriorate. Furthermore, if a mat-like heater is installed in the seat cushion 21, heat from that heater is not conveyed to the load sensor 50.

In the invention, because the sensing plate senses the load when a person sits on the seat cushion so as to flex the spring, the load sensor that is connected with a spring can sense when a person sits on the seat.

In addition, because a pair of holding members slide rectilinearly along the movement-guiding elements and thereby vary the area between the aforementioned electrodes, variation of the electrostatic capacitance between the electrodes can be precisely sensed.

In addition, because an insulating spacer between one pair of the holding members acts to maintain a constant gap between the two electrodes, the electrostatic capacitance between the electrodes varies only when the pair of the holding members slide rectilinearly, whereby the sensing device can detect not only when a person sits in the seat, but it can also easily measure the weight of that person.

EXPLANATION OF NUMBERS IN THE DRAWINGS

1 Car seat
2 Seat back
3 Seat cushion
4 Seat-occupant sensing device
5 Sensor-support part
6 Pressure sensor
7 Wire
8 Harness wire
9 Cushion frame
10 Flexible cushion support
11 Cushion pad
12 Trim cover
21 Cushion frame
23 Bottom part of cushion frame
24 Vertical side part of cushion frame
25 Flexible cushion support
26 Main cushion-support member
27 Cushion-support coil spring
41 Pan-type cushion frame
42 Sensing plate
43 Sensing-plate coil spring
44 Vertical side part of pan-type cushion frame
45 Bottom part of pan-type cushion frame
47 Slit
50 Load sensor
51 Sensor part
52 Pressure-pressure-detecting spring
52*a* Coil portion
52*b* Hook portion
53 Outer holding member
53*a* Inner face
53*c* Retainer portion
54 Inner holding member
54*a* Outer face
54*c* Retainer portion
55 Movement-guiding elements
55*a* Movement-guiding grooves
55*b* Movement-guiding prominences
56 Electrode
57 Electrode
58 Terminal
59 Terminal
71 Insulating spacer A Line indicating cross-section of front-to-back view of a seat cushion G Gap between electrodes

What is claimed is:

1. A seat-occupant sensing device for a car seat, said sensing device comprising:

a frame of the car seat:

a cushion support for supporting a cushion of the car seat;

a load sensor having a pressure-detecting spring and two electrodes positioned to form a capacitor, said electrodes having regions that face each other, an area of said regions defining an electrostatic capacitance of said capacitor, said area and said capacitance varying as said pressure-detecting spring contracts or extends; and a pair of inner and outer electrode holding members made of insulating material and mounted to be slidable along each other as the pressure-detecting spring extends or contracts;

wherein one end of said pressure-detecting spring is connected to said frame, and the other end of said pressure-detecting spring is connected to said cushion support.

2. The device of claim 1, wherein each of said electrodes is formed on one of said inner and outer holding members.

3. The device of claim 2, wherein said inner holding member is telescopically received within said outer member, said inner holding member being a tubular element, said pressure-detecting spring being at least partially received inside said tubular element and having two opposite ends each being engaged with one of said inner and outer holding members.

4. The device of claim 1, further comprising a projection formed on one of said inner and outer holding members and a matching groove formed on the other of said inner and outer holding members, said projection riding in and along said groove so that said inner and outer electrode holding members are slidable along each other as said spring contracts or expands.

5. The device of claim 1, wherein said inner holding member is telescopically received within said outer member so that a gap between said electrodes is substantially constant.

6. The device of claim 1, wherein said cushion support is connected to said frame by a plurality of springs arranged circumferentially of said cushion support, said pressure-detecting spring being one of said springs.

7. The device of claim 6, wherein said frame has an opening, and said cushion support is disposed within said opening and is connected to said frame by said springs which are arranged circumferentially of said cushion support and said opening.

8. The device of claim 1, wherein said cushion support and said load sensor are positioned in a backrest portion of said frame.

9. The device of claim 1, further comprising a spacer inserted between said holding members, wherein said spacer is made of insulating material and has a substantially constant thickness.

10. A seat-occupant sensing device for a car seat, said sensing device comprising:

a frame of the car seat, said frame having a bottom and at least two opposite side walls extending from said bottom;

a load sensor having a pressure-detecting spring and two electrodes positioned to form a capacitor, said electrodes having regions that face each other, an area of said regions defining an electrostatic capacitance of said capacitor, said area and said capacitance varying as said pressure-detecting spring contracts or extends; and a pair of inner and outer electrode holding members made of insulating material and mounted to be slidable along each other as the pressure-detecting spring extends or contracts;

wherein said pressure-detecting spring is attached to and extends between said opposite side walls.

11. The device of claim 10, wherein each of said electrodes is formed on one of said inner and outer holding members.

12. The device of claim 11, wherein said inner holding member is telescopically received within said outer member, said inner holding member being a tubular element, said pressure-detecting spring being at least partially received inside said tubular element and having two opposite ends each being engaged with one of said inner and outer holding members.

13. The device of claim 10, further comprising a spacer inserted between said holding members, wherein said spacer is made of insulating material and has a substantially constant thickness.

14. The device of claim 13, wherein said inner holding member is telescopically received within said outer member.

15. The device of claim 10, further comprising a projection formed on one of said inner and outer holding members and a matching groove formed on the other of said inner and outer holding members, said projection riding in and along said groove so that said inner and outer electrode holding members are slidable along each other as said spring contracts or expands.

16. The device of claim 10, further comprising a sensing plate attached to and extending between said side walls of said frame, wherein one end of said pressure-detecting spring being connected to one of two opposite longitudinal ends of said sensing plate and the other end of said pressure-detecting spring being connected to one of said side walls.

17. The device of claim 16, further comprising a spring having opposite ends connected to the other longitudinal end of said sensing plate and the other side wall, respectively.

18. A seat-occupant sensing device for a car seat, said sensing device comprising:

a load sensor having a pressure-detecting spring and two electrodes positioned to form a capacitor, said electrodes having regions that face each other, an area of said regions defining an electrostatic capacitance of said capacitor, said area and said capacitance varying as said pressure-detecting spring contracts or extends; and a pair of inner and outer electrode holding members made of insulating material and mounted to be slidable along each other as the pressure-detecting spring extends or contracts;

wherein said inner and outer electrode holding members are tubular members received telescopically one inside another to define a housing that is expandable and collapsible in an axial direction of said tubular elements as said pressure-detecting spring contracts or extends.

19. The device of claim 18, wherein said pressure-detecting spring is received inside said housing and extends in said axial direction from one axial end of said housing to an opposite axial end thereof.

20. The device of claim 19, wherein said pressure-detecting spring has two opposite ends each extending outwardly beyond and being fixed to one of said axial ends of said housing.

* * * * *